Oct. 7, 1969   H. B. SARGENT ET AL   3,471,675
ARC TORCH
Filed April 20, 1966
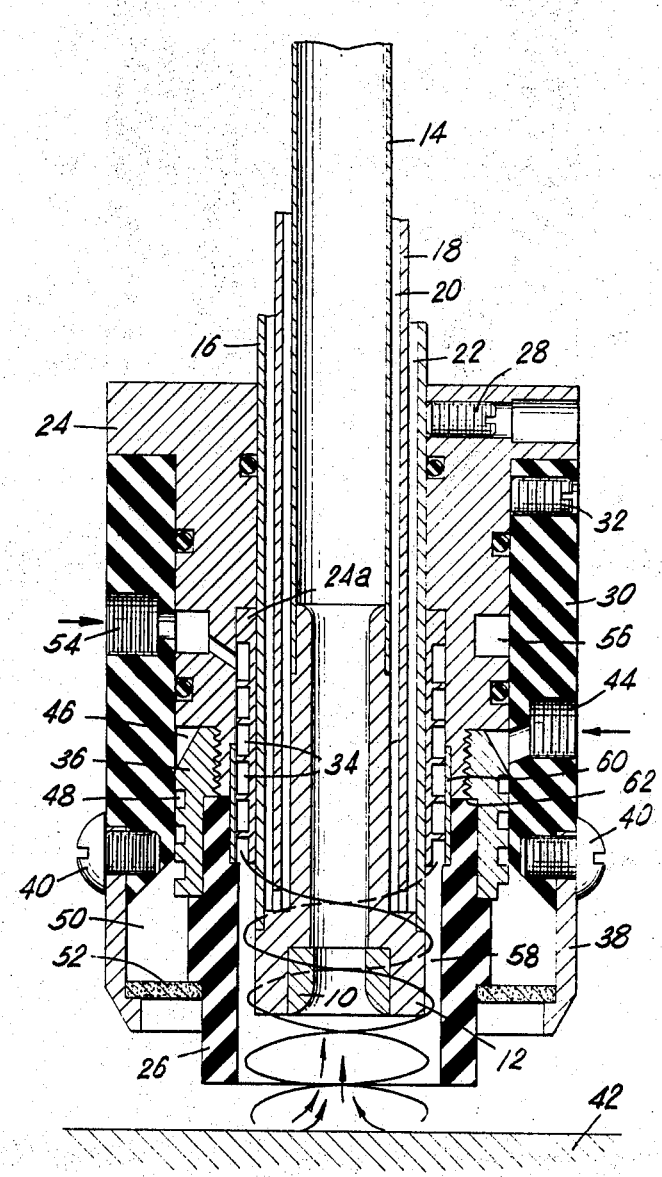
INVENTORS
HERBERT B. SARGENT
DONALD M. YENNI
BY Barnwell T. King
ATTORNEY United States Patent Office 3,471,675
Patented Oct. 7, 1969

3,471,675
ARC TORCH
Herbert B. Sargent and Donald M. Yenni, Indianapolis, Ind., assignors to Union Carbide Corporation, a corporatio of New York
Filed Apr. 20, 1966, Ser. No. 543,920
Int. Cl. B23k 9/16
U.S. Cl. 219—75                5 Claims

ABSTRACT OF THE DISCLOSURE

A transferred arc torch is provided with a vacuum means for reversing the flow of a swirling gas as it leaves the workpiece to achieve a tornado effect. This effect creates a dynamic flow system, restricts the arc, and increases arc stability. The torch includes a swirl chamber located between a gas cup and a combination hollow electrode and holder defining a gas exit passage therethrough. The vacuum means is connected to the electrode holder for reversing the flow of gas up through the electrode after it strikes the workpiece, thus creating the dynamic flow. A second swirl chamber is provided around the gas cup for directing an auxiliary shielding gas through a gas lens for shielding the arc region.

---

This invention relates to arc torches, and more particularly to those of the transferred or work-in-circuit type employing reverse-swirl flow of the arc shielding gas.

The invention provides a transferred arc torch comprising an axially elongated gas cup, the annular gas outlet of which is adapted to face the work adjacent the surface thereof, an electrode disposed within said cup, means for energizing an arc between the work and said electrode, means for supplying arc shielding gas to said cup in a swirling flow pattern adjacent the gas inlet end thereof, and means for reversing the flow of such gas as it continues to swirl with respect to the axis of said electrode upon leaving the arc region.

The reverse flow concept wherein the arc gas flow from the workpiece back through the torch is quite effective in reducing undercutting in metals being welded. In addition, it yields narrower weld beads, thus causing less distortion of the member being welded. In addition to achieving these desirable results the present invention utilizes the reverse flow concept to achieve a desirably low pressure region at the weld puddle.

This low pressure region exists in the vortex caused by the combination of swirl and reverse flows. The distribution of pressure above the workpiece resulting from this combination arises in the same way as the distribution of pressure above the ground in a tornado. In each case there is a mass of rotating gas surrounding a central rising column of even more rapidly rotating gas, the whole being underlaid by a relatively rigid surface. As each element of gas spirals inward along a path of decreasing radius its tangential velocity increases in accord with the natural tendency for momentum to be preserved, its centrifugal force increases correspondingly, and the pressure gradient opposing this force causes the pressure to be lowest at the center. The downward flow of gas against the weld puddle commonly encountered in conventional arcs does not occur in the reverse-flow swirl-flow torch of the invention.

In addition to needing both swirl and reverse flows to achieve the tornado effect, it is also desirable to have an auxiliary gas shield around the swirl flow.

Advantages of this tornado phenomenon include the creation of an aerodynamic flow system which counterbalances arc blow, restricts the arc at the workpiece by the inward direction of relatively cold gas flow, and increases arc stability.

The invention can more readily be described with reference to the accompanying drawings in which:

The sole figure is a fragmentary view in partial section of a preferred arc device for carrying out the invention.

Referring to the drawing, hollow electrode 10 is carried by electrode holder 12 which in turn is carried by tube 14 and sleeve 16. This assembly is connected to holding means (not shown) which may, for example, be the vacuum pump assembly for the device. Sleeve 18 provides cooling annuli 20 and 22 so that the electrode holder 12 and the electrode 10 can be water cooled.

The swirl component for the swirl-reverse flow combination is achieved through a swirl generator assembly 24 and 24a and the gas cup 26 which is made from an electrical insulating material. Member 24 is held in vertical alignment with respect to sleeve 16 through set screw 28. Surrounding member 24 is an electrical insulator sleeve 30 which is held in vertical alignment through set screw 32. Swirl gas passages 34 are formed by the double pitch thread of assembly 24a.

The gas flow through gas cup 26 provides the necessary swirling flow which, together with the reverse flow, effectuates the desired tornado phenomenon.

The preferred torch of the present invention also utilizes swirl gas flow for distributing shielding gas supplied to the upper side of porous bronze screen 52. This swirl is achieved through the threaded electrical insulator ring 36. The outer gas cup 38 for this shielding gas is secured to sleeve 30 through screws 40. The flow issuing from the lower side of the porous bronze screen 52 is axial, the swirl being substantially eliminated by the screen. This shielding gas flow prevents air from reaching the arc region.

The torch is operated in a transferred manner. Thus a suitable power connection is made to the torch and to the workpiece 42. The torch may be operated on direct current with straight or reverse polarity and on alternating current, preferably with high frequency stabilization. When operating on DCRP, the preferred material for electrode 10 is copper, while for DCSP and ACHF tungsten is preferred. In either case, the electrode is radiused to provide better gas vortex stability and hence better arc stability. When using tungsten, the annular thickness of the tungsten should be at least 3/32 of an inch. Any thinner tungsten results in erratic behavior of the arc since the entire electrode does not heat up evenly.

The starting procedure for the torch is as follows:

(1) Turn on shielding gas. Shielding gas such as argon enters the torch through inlet 44 into annulus 46 from whence it passes through swirl passages 48 into annulus 50. From annulus 50 the gas passes through porous bronze screen 52 so as to achieve a uniform gas distribution. This shielding gas not only protects the work area from the atmosphere, but also, in the case of this invention, prevents air from being inspirated up through the torch through the effect of the reverse flow-swirl flow combination.

(2) Turn on swirl gas and reverse flow. A suitable gas, depending upon the use of the torch, enters inlet 54 into annulus 56 from whence it passes to swirl passages 34. The gas then passes down through the annulus 58 and then up through the torch by way of the electrode 10, electrode holder 12 and tube 14. Sleeve 60 prevents any discontinuity in the flow that may arise from the joint 62 or the insulating material of sleeve 26. This reverse flow is achieved by connecting a vacuum pump (not shown) to tube 14. The path of the combined swirl-reverse flow can generally be shown by the arrows. This flow pattern yields the tornado phenomenon previously discussed.

(3) Turn on power supply.

(4) Apply high frequency generator to start the arc. The cooling water should be turned on prior to arc initiation.

The correct stopping procedure is as follows. Failure to follow the proper sequence might result in metal inspiration into the torch.

(1) Turn off swirl gas and reverse flow.
(2) Turn off power supply immediately after step 1.
(3) Turn off shield gas after electrode has cooled.

It has been found that the two variables that are critical in this system are the swirl flow rate and velocity and the reverse flow rate. They work together to produce a stabilized, high intensity arc that is restricted at the workpiece. The reverse flow rate and the swirl flow rate will not be equal because of either the loss of swirl flow to the surrounding atmosphere, or the inspiration of gases from the surrounding atmosphere. That is, swirl flow rate is the rate measured at the inlet 54, while the reverse rate is the rate measured at the vacuum pump.

Examination of photographs of weld beads made by the reverse-swirl combination reveals that low swirl in relation to a constant reverse flow yields undercutting in welds, while high swirl yields overcutting. Overcutting is a new phenomenon arising from reverse flow; raised bead edges and depressed center sections are characteristics. In general, too small an amount of swirl at a constant reverse flow produces a broad shallow bead with undercut, requiring large currents for full penetration. Too large an amount of swirl disturbs the weld puddle, produces overcut, and causes arc instability.

These two phenomena (undercut and overcut) arise from the lack of balance between forces imposed on the workpiece or weld puddle. In a direction toward the workpiece there is the force of arc blow. Arc blow is dependent upon the arc current density. In the opposite direction is the pull caused by the angular momentum of the reverse-swirl combination. Ideally these two forces would be in balance. In welding 1/8" stainless steel, for example, at speeds of 30 i.p.m. at currents of from about 500–600 amperes, a swirl flow of about 75 c.f.h. was found to be suitable at a constant reverse flow of 80 c.f.h.

The following table shows different reverse flow conditions at constant swirl flow for making weld beads on 1/8" stainless steel stock. In acquiring the data, apparatus of the type depicted in the drawings was used.

| Sample No. | Welding speed, i.p.m. | Current, amp. | Potential, volts | Stand-off, inch | Set-back, inch | Swirl flow, c.f.h. | Reverse flow, c.f.h. | Shield flow, c.f.h. |
|---|---|---|---|---|---|---|---|---|
| 990 | 30 | 560 | 21 | 1/16 | 1/4 | 54 | 30 to 0 | 230 |
| 989 | 30 | 700 | 28 | 1/16 | 1/4 | 54 | 30 | 230 |
| 988 | 30 | 560 | 29 | 1/16 | 1/4 | 54 | 45 | 230 |
| 987 | 30 | 570 | 32 | 1/16 | 1/4 | 54 | 60 | 230 |

In the table:

Standoff is the distance between the workpiece and the 20 end of sleeve 26.

Setback is the distance between the end of sleeve 26 and the end of electrode 10.

In sample 990 the reverse flow was shut off after half of the bead was made. The section with zero reverse flow is broad with heavy undercut. Sample 987 with 60 c.f.h. reverse flow is a narrow, undercut-free weld bead. As pointed out previously, there is an optimum reverse flow swirl flow combination. The two are interdependent, and the optimum is a function of torch geometry, arc current, and material being welded.

What is claimed is:

1. A transferred arc torch comprising an axially elongated gas cup having an annular gas outlet which is adapted to face the work adjacent the surface thereof, an electrode disposed within said cup, means for energizing an arc between the work and said electrode, means for supplying arc shielding gas to said cup in a swirling flow pattern adjacent the gas inlet end thereof passage means inside said nozzle for receiving a reverse flow of gas, and means operable with said passage means for reversing the flow of gas as it continues to swirl with respect to the axis of said electrode upon leaving the arc region.

2. A transferred arc torch as defined by claim 1, in which said electrode is annular, and said passage means is an axial passage extending therethrough.

3. A torch as defined by claim 2 comprising a water cooled tubular holder for said electrode, having a gas passage in communicaiton with said axial passage.

4. A torch as defined by claim 1 comprising means for discharging an annular stream of auxiliary shielding gas around such swirling gas stream to protect the latter from atmospheric contamination.

5. A torch as defined by claim 1 in which said cup is composed of insulating material.

References Cited

UNITED STATES PATENTS

| 2,806,124 | 9/1957 | Gage | 219—130 X |
| 3,027,446 | 3/1962 | Browning | 219—75 |
| 3,139,509 | 6/1964 | Browning | 219—75 |
| 3,377,457 | 4/1968 | Pratt | 219—75 |

JOSEPH V. TRUHE, Primary Examiner

J. G. SMITH, Assistant Examiner